(12) United States Patent
Lind et al.

(10) Patent No.: US 11,568,128 B2
(45) Date of Patent: Jan. 31, 2023

(54) AUTOMATED DETERMINATION OF DATA VALUES FOR FORM FIELDS

(71) Applicant: SAP SE, Walldorf (DE)

(72) Inventors: Jesper Lind, Bellevue, WA (US); Anupam Dewan, Bellevue, WA (US)

(73) Assignee: SAP SE, Walldorf (DE)

( * ) Notice: Subject to any disclaimer, the term of this patent is extended or adjusted under 35 U.S.C. 154(b) by 179 days.

(21) Appl. No.: 16/906,906

(22) Filed: Jun. 19, 2020

(65) Prior Publication Data

US 2021/0326517 A1   Oct. 21, 2021

Related U.S. Application Data

(60) Provisional application No. 63/010,579, filed on Apr. 15, 2020.

(51) Int. Cl.
| | | |
|---|---|---|
| *G06F 40/174* | (2020.01) | |
| *G06F 16/9035* | (2019.01) | |
| *G06N 20/20* | (2019.01) | |
| *G06Q 40/02* | (2012.01) | |

(52) U.S. Cl.
CPC ........ *G06F 40/174* (2020.01); *G06F 16/9035* (2019.01); *G06N 20/20* (2019.01); *G06Q 40/02* (2013.01)

(58) Field of Classification Search
None
See application file for complete search history.

(56) References Cited

U.S. PATENT DOCUMENTS

| | | | | |
|---|---|---|---|---|
| 9,117,208 | B2* | 8/2015 | Drury | G06Q 20/027 |
| 9,916,606 | B2* | 3/2018 | Stroh | G06Q 30/04 |
| 10,235,720 | B2* | 3/2019 | Abraham | G06Q 40/12 |
| 10,311,556 | B1* | 6/2019 | Farivar | G06K 9/6232 |
| 10,956,986 | B1* | 3/2021 | Ran | G06Q 40/12 |
| 11,120,899 | B1* | 9/2021 | Rai | G06F 40/295 |
| 11,257,049 | B1* | 2/2022 | Durazo Almeida | G06V 30/413 |
| 2009/0171759 | A1* | 7/2009 | McGeehan | G06Q 40/00 705/35 |
| 2012/0185368 | A1* | 7/2012 | Schloter | G06Q 40/00 705/30 |
| 2013/0230205 | A1* | 9/2013 | Nuggehalli | G06V 10/10 382/100 |
| 2013/0230246 | A1* | 9/2013 | Nuggehalli | G06Q 10/10 382/176 |
| 2013/0232040 | A1* | 9/2013 | Nuggehalli | G06Q 10/10 705/30 |

(Continued)

*Primary Examiner* — Howard Cortes
(74) *Attorney, Agent, or Firm* — Fountainhead Law Group P.C.

(57) ABSTRACT

Some embodiments provide a non-transitory machine-readable medium that stores a program. The program receives from a client device an image and a user identifier associated with a user of the client device. Based on the user identifier, the program further retrieves a set of historical transactions associated with the user, the program also uses a first machine learning model to predict a string based on the image. The program further uses a second machine learning model to predict a set of digits based on the image. Based on the set of historical transaction data, the string, and the set of digits, the program also determines a data value for a field in a form.

20 Claims, 11 Drawing Sheets

(56) References Cited

U.S. PATENT DOCUMENTS

| | | | | |
|---|---|---|---|---|
| 2014/0101004 A1* | 4/2014 | Marseille | G06Q 10/10 | |
| | | | 705/30 | |
| 2014/0156537 A1* | 6/2014 | Vieira | G07F 19/201 | |
| | | | 705/304 | |
| 2014/0245120 A1* | 8/2014 | Schwartz | G06V 30/1456 | |
| | | | 715/226 | |
| 2014/0258838 A1* | 9/2014 | Evers | G06F 40/174 | |
| | | | 715/234 | |
| 2014/0324644 A1* | 10/2014 | Shoup | G06Q 40/12 | |
| | | | 705/30 | |
| 2015/0026021 A1* | 1/2015 | Khan | G06Q 10/1091 | |
| | | | 705/30 | |
| 2016/0358268 A1* | 12/2016 | Verma | G06F 16/24542 | |
| 2017/0004469 A1* | 1/2017 | Cassel | G06F 16/93 | |
| 2017/0200234 A1* | 7/2017 | Morse | G06F 40/143 | |
| 2018/0053259 A1* | 2/2018 | Brahma | G06Q 20/145 | |
| 2018/0082139 A1* | 3/2018 | Li | G06V 30/224 | |
| 2019/0026839 A1* | 1/2019 | Drangmeister | G06Q 40/125 | |
| 2019/0236552 A1* | 8/2019 | Rouseau | G06Q 40/125 | |
| 2019/0294921 A1* | 9/2019 | Kalenkov | G06K 9/6232 | |
| 2020/0104843 A1* | 4/2020 | Bhasin | G06Q 20/405 | |
| 2020/0110930 A1* | 4/2020 | Simantov | G06V 30/412 | |
| 2020/0250417 A1* | 8/2020 | Torres | G06F 40/30 | |
| 2021/0073735 A1* | 3/2021 | Wang | G06N 20/00 | |
| 2021/0073922 A1* | 3/2021 | Wang | G06Q 40/12 | |
| 2021/0125157 A1* | 4/2021 | Franceschi | G06Q 20/045 | |
| 2021/0136169 A1* | 5/2021 | Price | H04L 67/02 | |
| 2021/0248836 A1* | 8/2021 | Maranzana | G06F 16/5854 | |
| 2021/0326517 A1* | 10/2021 | Lind | G06N 20/20 | |

\* cited by examiner

300

| User History |
|---|
| 1234-AX-AX:3 |
| 1334-AX-AX:2 |
| 1254-AX-AX:1 |
| 1010-VI-VI:2 |
| 9191-$$-$$:3 |
| 1234-VI-$$:4 |
| 1232-VI-$$:2 |

| Corporate Cards |
|---|
| 1234-AX-AX:3 |
| 1334-AX-AX:2 |
| 1254-AX-AX:1 |
| 1010-VI-VI:2 |

| Personal Cards |
|---|
| 9191-$$-$$:3 |
| 1234-VI-$$:4 |
| 1232-VI-$$:2 |

FIG. 5

| | 1234-AX-AX | 1334-AX-AX | 1254-AX-AX | 1010-VI-VI |
|---|---|---|---|---|
| 1234-AX-AX | 100 | 90 | 90 | 20 |
| 1334-AX-AX | 90 | 100 | 90 | 20 |
| 1254-AX-AX | 90 | 90 | 100 | 20 |
| 1010-VI-VI | 20 | 20 | 20 | 100 |

FIG. 6

| | 9191-$$-$$ | 1234-VI-$$ | 1232-VI-$$ |
|---|---|---|---|
| 9191-$$-$$ | 100 | 30 | 35 |
| 1234-VI-$$ | 30 | 100 | 90 |
| 1232-VI-$$ | 35 | 90 | 100 |

| Corporate Cards | Confidence Score |
|---|---|
| 1234-AX | 0.75 |
| 1010-VI | 0.25 |

FIG. 9 — 900

| Personal Cards | Confidence Score |
|---|---|
| 9191-$$ | 0.3333 |
| 1234-VI | 0.6666 |

FIG. 10 — 1000

| | Confidence Score |
|---|---|
| Corp card type::Corp card digits | $score_{\text{corp card type}} \times score_{\text{corp card digits}}$ |
| Corp card type::Predicted digits | $score_{\text{corp card type}} \times score_{\text{predicted digits}}$ |
| Predicted card type::Corp card digits | $score_{\text{predicted card type}} \times score_{\text{corp card digits}}$ |
| Predicted card type::Predicted digits | $score_{\text{predicted card type}} \times score_{\text{predicted digits}}$ |

FIG. 11 — 1100

| Permutation | Confidence Score |
|---|---|
| Pers card type::Pers card digits | $score_{\text{corp card type}} \times score_{\text{corp card digits}}$ |
| Pers card type::Predicted digits | $score_{\text{corp card type}} \times score_{\text{predicted digits}}$ |
| Predicted card type::Pers card digits | $score_{\text{predicted card type}} \times score_{\text{corp card digits}}$ |
| Predicted card type::Predicted digits | $score_{\text{predicted card type}} \times score_{\text{predicted digits}}$ |

1200

| Expense | |
|---|---|
| Amount | |
| 1205 | 479.15 |
| Expense Type | |
| 1210 | Airfare |
| Date | |
| 1215 | 06/15/2019 |
| Vendor | |
| 1220 | Delta |
| Location | |
| 1225 | Seattle, Washington |
| 1230 | SUBMIT |

FIG. 12

Details

Expense Type: Airfare — 1305
Transactions Date: 06/15/2019 — 1310
Vendor Name: Delta — 1315
Payment Type: Corporate Card Transaction — 1320
Amount: 479.15 — 1325
City: Seattle, Washington — 1330
Currency: US, Dollar — 1335

AUTOMATED DETERMINATION OF DATA VALUES FOR FORM FIELDS

CROSS-REFERENCE TO RELATED APPLICATION

The present application claims the benefit and priority of U.S. Provisional Application No. 63/010,579, filed Apr. 15, 2020, entitled "System for Predicting Data for Data Transactions Using Machine Learning Models," the entire contents of which are incorporated herein by reference in its entirety for all purposes.

BACKGROUND

Many web pages provided on the Internet include forms that are used to request information from users. Such forms have various fields for which users are prompted to provide data values. For example, when creating an online account for a website, users are typically asked to provide a first name, a last name, an email address, a mailing address, a birthdate, etc. Oftentimes different forms have fields that ask for the same information, which can be repetitive and sometimes tedious for users to fill out. Once a user provides the requested information to the website, the online account can be created.

SUMMARY

In some embodiments, a non-transitory machine-readable medium stores a program executable by at least one processing unit of a device. The program receives from a client device an image and a user identifier associated with a user of the client device. Based on the user identifier, the program further retrieves a set of historical transactions associated with the user, the program also uses a first machine learning model to predict a string based on the image. The program further uses a second machine learning model to predict a set of digits based on the image. Based on the set of historical transaction data, the string, and the set of digits, the program also determines a data value for a field in a form.

In some embodiments, the program may further generate the form that includes the field and provide the client device the form with the field automatically set to the determined data value. The form may further include a set of fields. The program may further receive from the client a set of data values for the set of fields and a request to create a record based on the data value for the field and the set of data values for the set of fields; in response to the request, create the record; and store the record in a storage.

In some embodiments, each historical transaction the set of historical transactions may include a set of digits, a predicted string, an actual string, and a number of past transactions having the set of digits, the predicted string, and the actual string. Determining the data value for a field in the form may include grouping the set of historical transactions into a first group of historical transactions and a second group of historical transactions based on the actual strings of the set of historical transactions; determining a first historical transaction from the first group of historical transactions; determining a first score associated with the first historical transaction; determining a second historical transaction from the second group of historical transactions; determining a second score associated with the second historical transaction; and determining whether the actual string of the first historical transaction matches the string predicted based on the image. Determining the data value for a field in the form may further include, upon determining that the actual string of the first historical transaction does match the string predicted based on the image, determining a first data value as the data value for the field in the form; and, upon determining that the actual string of the first historical transaction does not match the string predicted based on the image, determining whether the actual string of the second historical transaction matches the string predicted based on the image. Determining the data value for a field in the form may further include, upon determining that the actual string of the second historical transaction does match the string predicted based on the image, determining a second data value as the data value for the field in the form; and, upon determining that the actual string of the second historical transaction does not match the string predicted based on the image, determining whether the set of digits of the first historical transaction matches the set of digits predicted based on the image.

In some embodiments, the program may further receive from the client device a company identifier representing a company with which the user of the client device is associated. Retrieving the set of historical transaction data associated with the user may be further based on the company identifier.

In some embodiments, a method receives from a client device an image and a user identifier associated with a user of the client device. Based on the user identifier, the method further retrieves a set of historical transactions associated with the user. The method also uses a first machine learning model to predict a string based on the image. The method further uses a second machine learning model to predict a set of digits based on the image. Based on the set of historical transaction data, the string, and the set of digits, the method also determines a data value for a field in a form.

In some embodiments, the method may further generate the form that includes the field and provide the client device the form with the field automatically set to the determined data value. The form may further include a set of fields. The method may further receive from the client a set of data values for the set of fields and a request to create a record based on the data value for the field and the set of data values for the set of fields; in response to the request, create the record; and store the record in a storage.

In some embodiments, each historical transaction the set of historical transactions may include a set of digits, a predicted string, an actual string, and a number of past transactions having the set of digits, the predicted string, and the actual string. Determining the data value for a field in the form may include grouping the set of historical transactions into a first group of historical transactions and a second group of historical transactions based on the actual strings of the set of historical transactions; determining a first historical transaction from the first group of historical transactions; determining a first score associated with the first historical transaction; determining a second historical transaction from the second group of historical transactions; determining a second score associated with the second historical transaction; and determining whether the actual string of the first historical transaction matches the string predicted based on the image. Determining the data value for a field in the form may further include, upon determining that the actual string of the first historical transaction does match the string predicted based on the image, determining a first data value as the data value for the field in the form; and, upon determining that the actual string of the first historical transaction does not match the string predicted based on the image, determining whether the actual string of the second historical transaction matches the string predicted based on the image. Determining the data value for a field in the form may further include, upon determining that the actual string of the second historical transaction does match the string predicted based on the image, determining a second data value as the data value for the field in the form; and, upon determining that the actual string of the second historical transaction does not match the string predicted based on the image, determining whether the set of digits of the first historical transaction matches the set of digits predicted based on the image.

In some embodiments, the method may further receive from the client device a company identifier representing a company with which the user of the client device is associated. Retrieving the set of historical transaction data associated with the user may be further based on the company identifier.

In some embodiments, a system includes a set of processing units and a non-transitory machine-readable medium that stores instructions. The instructions cause at least one processing unit to receive from a client device an image and a user identifier associated with a user of the client device. Based on the user identifier, the instructions further cause the at least one processing unit to retrieve a set of historical transactions associated with the user. The instructions also cause the at least one processing unit to use a first machine learning model to predict a string based on the image. The instructions further cause the at least one processing unit to use a second machine learning model to predict a set of digits based on the image. Based on the set of historical transaction data, the string, and the set of digits, the instructions also cause the at least one processing unit to determine a data value for a field in a form.

In some embodiments, the instructions may further cause the at least one processing unit to generate the form that includes the field and provide the client device the form with the field automatically set to the determined data value. The form may further include a set of fields. The instructions may further cause the at least one processing unit to receive from the client a set of data values for the set of fields and a request to create a record based on the data value for the field and the set of data values for the set of fields; in response to the request, create the record; and store the record in a storage.

In some embodiments, each historical transaction the set of historical transactions may include a set of digits, a predicted string, an actual string, and a number of past transactions having the set of digits, the predicted string, and the actual string. Determining the data value for a field in the form may include grouping the set of historical transactions into a first group of historical transactions and a second group of historical transactions based on the actual strings of the set of historical transactions; determining a first historical transaction from the first group of historical transactions; determining a first score associated with the first historical transaction; determining a second historical transaction from the second group of historical transactions; determining a second score associated with the second historical transaction; and determining whether the actual string of the first historical transaction matches the string predicted based on the image. Determining the data value for a field in the form may further include, upon determining that the actual string of the first historical transaction does match the string predicted based on the image, determining a first data value as the data value for the field in the form; and, upon determining that the actual string of the first historical transaction does not match the string predicted based on the image, determining whether the actual string of the second historical transaction matches the string predicted based on the image. Determining the data value for a field in the form may further include, upon determining that the actual string of the second historical transaction does match the string predicted based on the image, determining a second data value as the data value for the field in the form; and, upon determining that the actual string of the second historical transaction does not match the string predicted based on the image, determining whether the set of digits of the first historical transaction matches the set of digits predicted based on the image.

The following detailed description and accompanying drawings provide a better understanding of the nature and advantages of various embodiments of the present disclosure.

BRIEF DESCRIPTION OF THE DRAWINGS

FIG. 3 illustrates an example of historical transactions according to some embodiments.

FIG. 4 illustrates a first group of the historical transactions illustrated in FIG. 3 according to some embodiments.

FIG. 5 illustrates a second group of the historical transactions illustrated in FIG. 3 according to some embodiments.

FIG. 6 illustrates similarity scores for the historical transactions in the first group of historical transactions illustrated in FIG. 4 according to some embodiments.

FIG. 7 illustrates similarity scores for the historical transactions in the second group of historical transactions illustrated in FIG. 5 according to some embodiments.

FIG. 8 illustrates confidence scores for historical transactions in the first group of historical transactions illustrated in FIG. 4 according to some embodiments.

FIG. 9 illustrates confidence scores for historical transactions in the second group of historical transactions illustrated in FIG. 5 according to some embodiments.

FIG. 10 illustrates an example of permutations of strings and digits according to some embodiments.

FIG. 11 illustrates another example of permutations of strings and digits according to some embodiments.

FIG. 12 illustrates an example graphical user interface (GUI) that includes an expense form according to some embodiments.

FIG. 13 illustrates an example GUI of a web tool according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for automated determination of data values for form fields. In some embodiments, a computing system receives an image of a receipt from a user of a client device. The computing system performs some optical character recognition operations on the image to extract text from the image. Next, the computing system uses several machine learning models to predict a type of credit card used to purchase the items listed on the receipt and to predict the last four digits of the credit card. Then, the computing system retrieves past transactions associated with the user that each specifies the type of credit card used and the last four digits of the credit card. Based on the past transactions, the predicted type of credit card, and the predicted last four digits of the credit card, the computing system determines whether the credit card used to purchase the items listed on the receipt is a corporate credit card or a personal credit card. Next, the computing system generates a form for submitting expenses and automatically fills a payment type field in the form with the determined corporate credit card or personal credit card. The computing system provides the form to the client device for the user to review and/or edit fields. Finally, when the user is finished reviewing and/or editing the fields, the user of the client device sends the data values for the fields to the computing system.

Figure 1:
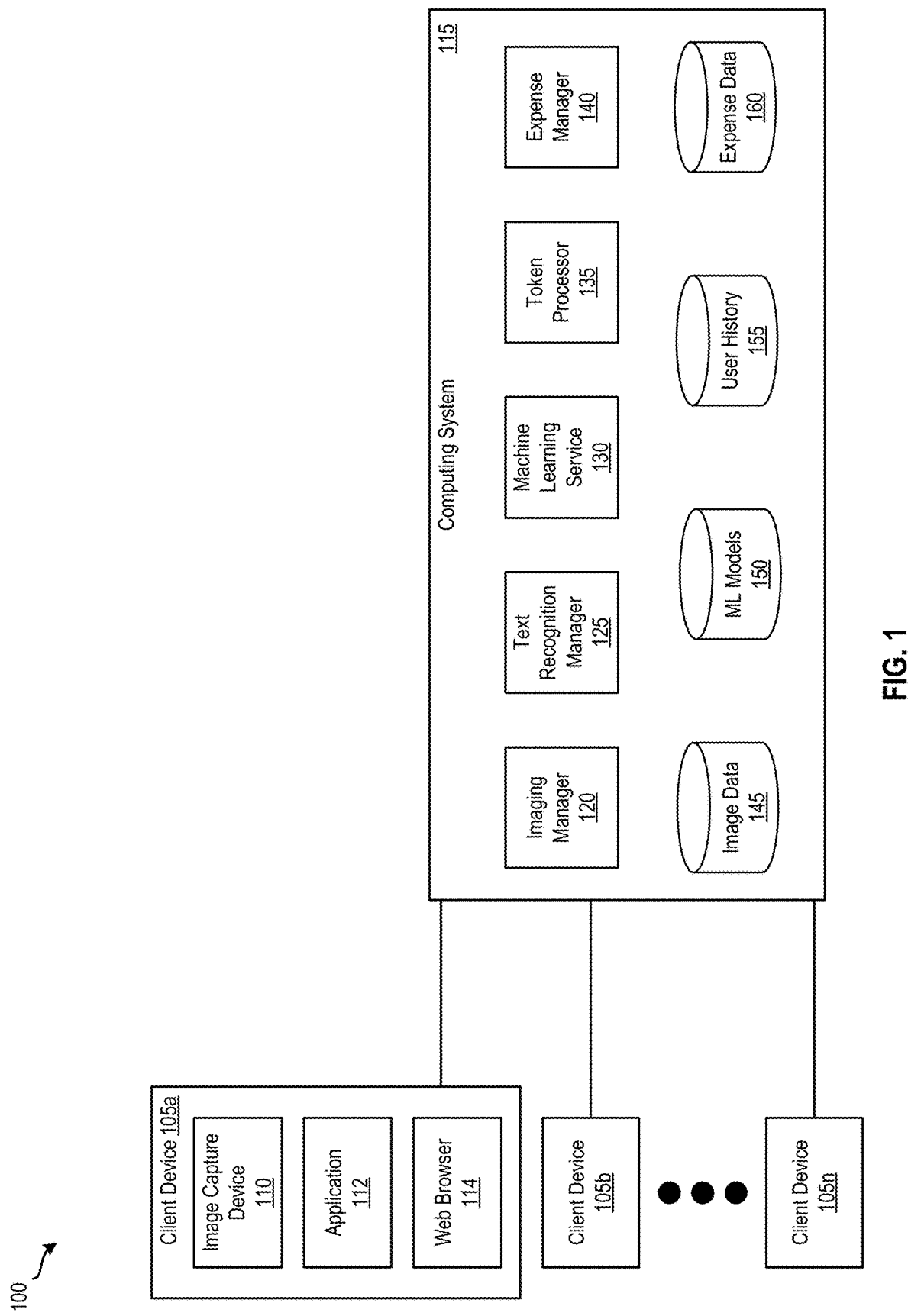
FIG. 1 illustrates a system for automated determination of data values for form fields according to some embodiments.

FIG. 1 illustrates a system 100 for automated determination of data values for form fields according to some embodiments. As shown, system 100 includes client devices 105a-n and computing system 115. Client devices 105 a-n are configured to communicate and interact with computing system 115. In this example, client device 105a includes image capture device 110, application 112, and web browser 114. Image capture device 110 is configured to capture photographs and create digital images of the photographs. In some embodiments, client device 105a can be a mobile device (e.g., a smartphone, a tablet, etc.) and image capture device 110 can be a camera connected to or included in the mobile device. In other embodiments, client device 105a may be a desktop computer or laptop and image capture device 110 may be a webcam connected to or included in the desktop computer or laptop.

Application 112 is a software application operating on client device 105a that is configured to transmit images to computing system 115, receive forms from computing system 115, and transmit data values for fields in forms to computing system 115. When application 112 sends an image to computing system 115, application also sends computing system 115 a user identifier (ID) associated with the user of the client device 105 and a company ID representing a company with which the user of client device 105 is associated. In some cases, the image that client device 105a sends to computing system 115 can be a digital image created by a device other than an image capture device connected to or included in client device 105a. For example, the image may be created using a digital camera, a scanner, etc. Regardless of the manner in which an image is created, application 112 may perform some preprocessing operations on the image before application 112 sends it to computing system 115. For instance, application 112 can convert the image to grayscale, crop the image to a defined dimension, aspect ratio, and/or file size that is supported by computing system 115, etc.

Web browser 114 is a software application operating on client device 105a for accessing web pages and web tools.

For example, a user of client device 105a may use web browser 114 to access, view, edit, delete, etc., records managed by and stored on computing system 115. FIG. 1 does not show client devices 105b-n having an image capture device, an application, and a web browser. However, each of the client devices 105a-n can include an application similar to application 112 and a web browser similar to web browser 114. In addition, any of client devices 105b-n may include an image capture device similar to image capture device 110.

After sending an image to computing system 115, application 112 may receive a form with fields. In some embodiments, some or all of the fields of the form are already filled (also referred to as pre-filled fields) with data values. A user of client device 105a can provide data values for empty fields via application 112. Also, the user of client device 105a may review and edit data values in pre-filled fields. In some embodiments, one or more of the pre-filled fields are not visible to the user of client device 105a. These invisible pre-filled fields are included in the form but hidden from view of the user. Once the user of client device 105a is finished reviewing and/or editing data values of fields in the form, the user can use application 112 to transmit data values for fields in the form to computing system 115.

As illustrated in FIG. 1, computing system 115 includes imaging manager 120, text recognition manager 125, machine learning service 130, token processor 135, expense manager 140, and storages 145-160. Image data storage 145 stores digital images (e.g., digital image received from client devices 105a-n.). Machine learning (ML) models storage 150 stores different ML models used to predict different types of data. User history storage 155 is configured to store historical transactions (e.g., past transactions) associated with users (e.g., users of client devices 105a-n). In some embodiments, a transaction is a purchase of a set of items. Such a transaction can include a date on which the transaction occurred, a predicted type of credit card, and an actual type of credit card used to purchase the set of items, a predicted last four digits of the credit card, a user ID, and a company ID. Expense data storage 160 is configured to store records for expense purposes. In some embodiments, a record includes a date on which the transaction occurred, a location at which the transaction occurred, a set of items, a total amount, a currency, an expense type, a vendor, a type of credit card used to purchase the set of items, and the last four digits of the credit card used to purchase the set of items. In some embodiments, storages 145-160 are implemented in a single physical storage while, in other embodiments, storages 145-160 may be implemented across several physical storages. While FIG. 1 shows storages 145-160 as part of computing system 115, one of ordinary skill in the art will appreciate that image data storage 145, ML models storage 150, user history storage 155, and/or expense data storage 160 may be external to computing system 115 in some embodiments.

Imaging manager 120 handles images received from client devices 105a-n. For example, imaging manager 120 may receive from a client device 105 an image, a user ID, and a company ID. Upon receiving the data, imaging manager 120 stores the image in image data storage 145. Then, imaging manager 120 sends the user ID and the company ID to token processor 135. Finally, imaging manager 120 sends text recognition manager 125 a message indicating that the image is ready for processing.

Text recognition manager 125 is configured to perform text recognition operations on images. For instance, text recognition manager 125 can receive a message indicating that an image is ready for processing. In response, text recognition manager 125 accesses image data storage 145 to retrieve the image. Next, text recognition manager 125 performs a set of optical character recognition (OCR) operations on the image to extract text from the image. Text recognition manager 125 then sends the extracted text to machine learning service 130.

Machine learning service 130 is responsible for determining tokens from text. In some embodiments, machine learning service 130 uses various ML models to predict tokens from text. For instance, when machine learning service 130 receives text from text recognition manager 125, machine learning service 130 retrieves a first ML model from ML models storage 150 that is configured to predict a type of credit card from text. Machine learning service 130 uses the first ML model to predict a type of credit card from the text received from text recognition manager 125 and determine a confidence score associated with the predicted type of credit card. A type of credit card can be an issuer of a particular credit card. Examples of such types of credit cards include American Express®, Visa®, Mastercard®, Discover®, etc. Machine learning service 130 may also retrieve a second ML model from ML models storage 150 that is configured to predict a define number of digits of a credit card from text. For example, machine learning service 130 uses the second ML model to predict the last four digits of a credit card from the text received from text recognition manager 125 and determine a confidence score associated with the predict last four digits of the credit card. Other types of ML models that machine learning service 130 retrieves from ML models storage 150 and uses to predict tokens from text include ML models for predicting a date on which the transaction occurred, a location at which the transaction occurred, a total amount, a currency, an expense type, and a vendor. After predicting tokens from the text, machine learning service 130 sends the predicted tokens and associated confidence scores to token processor 135. In some embodiments, the confidence scores determined by an ML model is a value between 0 and 1.

Token processor 135 is configured to process tokens and confidence scores received from machine learning service 130 to determine data values for fields in forms. Token processor 135 may use different techniques to determine data values for different fields of a form. For example, token processor 135 can use a transaction matching technique to determine a data value for a payment type field. In some embodiments, token processor 135 uses information associated with a credit card transaction that token processor 135 receives from machine learning service 130 to make such a determination. Specifically, token processor 135 uses a predicted type of a credit card used in a transaction, a confidence score associated with the predicted type of the credit card, a predicted last four digits of the credit card, and a confidence score associated with the predicted last four digits of the credit card. Token processor 135 also receives from imaging manager 120 a user ID and company ID associated with the credit card transaction. Upon receiving these IDs, token processor 135 accesses user history storage 155 and retrieves historical transactions associated with the user ID and the company ID. In some embodiments, token processor 135 retrieves historical transactions that occurred within a defined window of time (e.g., the most recent month, the most recent three months, the most recent six months, etc.). Based on the historical transactions, the predicted type of a credit card used in a transaction, the confidence score associated with the predicted type of the credit card, the predicted last four digits of the credit card, and the confidence score associated with the predicted last four digits of the credit card, token processor 135 determines a transaction from the historical transactions that matches the credit card transaction received from machine learning service 130. Based on the determined matching transaction, token processor 135 determines a data value for the payment type field for a form.

After determining data values for fields, token processor 135 generates a form for capturing information associated with the transaction (also referred to as an expense form). In some embodiments, the form includes a payment type field, a date field, a location field, a total amount field, a currency field, an expense type field, a vendor field, etc. Token processor 135 fills in the payment type field with the data value determined using the techniques described herein. Token processor 135 can also fill some or all of the other fields in the form with corresponding determined data values. After pre-filling fields in the form, token processor 135 sends the form to the client device from which the image used to determined tokens was received.

Expense manager 140 serves to manage expense data. For instance, expense manager 140 can receive from a client device 105 data values specified for fields in an expense form. In response to receiving the data values, expense manager 140 generates a record and populates attributes in the record with corresponding data values from fields in the form. As mentioned above, in some embodiments, a record includes a date on which the transaction occurred, a location at which the transaction occurred, a set of items, a total amount, a currency, an expense type, a vendor, a type of credit card used to purchase the set of items, and the last four digits of the credit card used to purchase the set of items. In some such embodiments, expense manager 140 populates these attributes with data values from the respective fields in the form. Then, expense manager 140 stores the record in expense data storage 160. Expense manager 140 may also generate a transaction record that includes a date on which the transaction occurred, a predicted type of credit card, and an actual type of credit card used for the transaction, a predicted last four digits of the credit card, the user ID associated with the transaction, and the company ID associated with the user. Expense manager 140 stores the transaction in user history storage 155.

Expense manager 140 can also handle requests for expense data. For example, when computing system 115 receives a request for an expense record from a client device 105 via a web tool provided by computing system 115, expense manager 140 handles the request by accessing expense data storage 160, retrieving the requested expense record, and providing it to the client device 105 via the web tool. Expense manager 140 may handle requests received from a client devices 105 through an application (e.g., application 112) operating on the client devices 105 in a similar manner as those received through the web tool.

Figure 2:
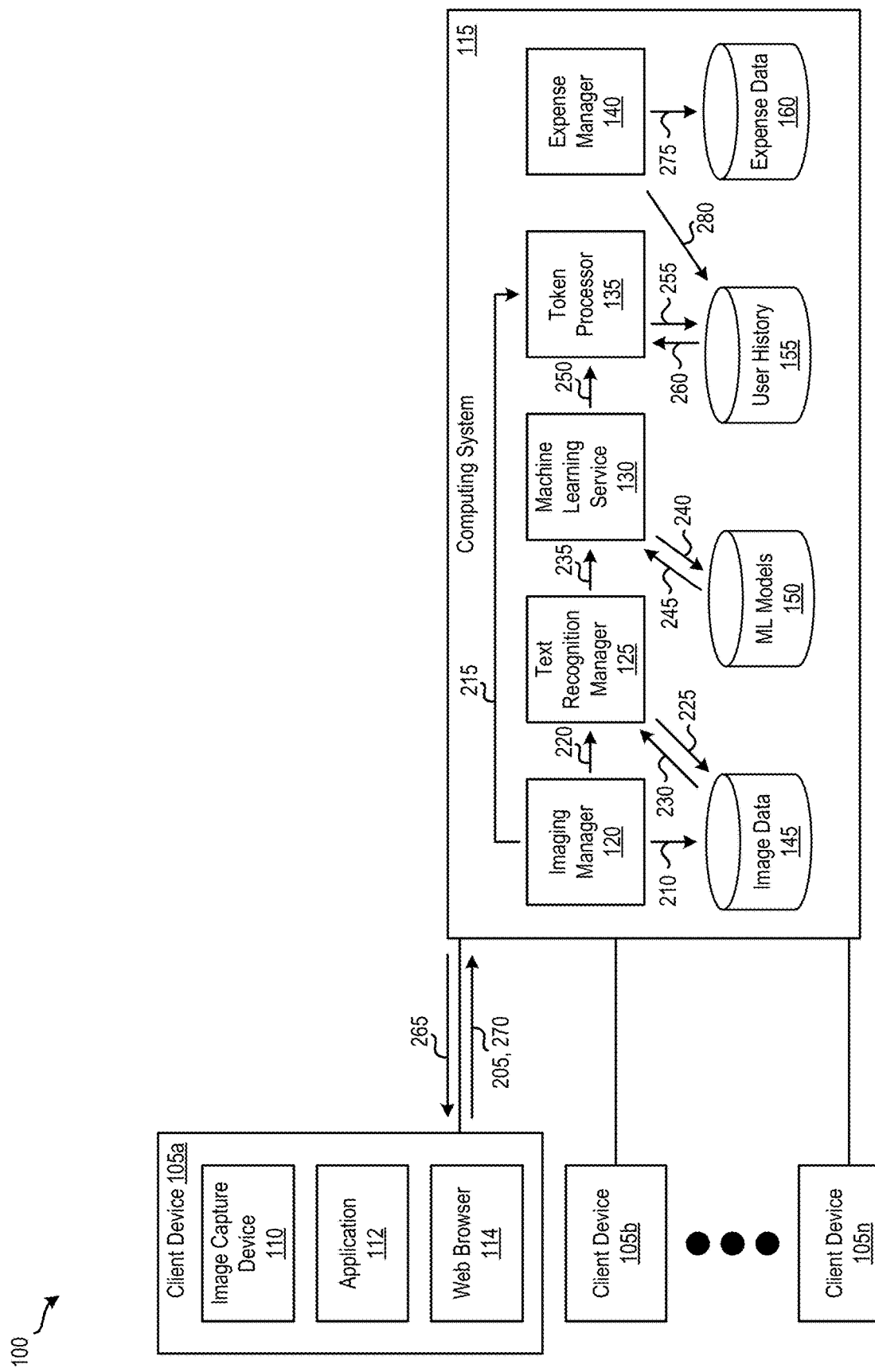
FIG. 2 illustrates an example dataflow through the system illustrated in FIG. 1 according to some embodiments.

An example operation of system 100 will now be described by reference to FIGS. 2-13. FIG. 2 illustrates an example dataflow through the system illustrated in FIG. 1 according to some embodiments. The dataflow starts by a user of client device 105a capturing a receipt of a transaction that occurred as part of the user's employment with a company and that was paid using a credit card. In this example, the type of the credit card is an American Express® and the last four digits of the credit card is 1234. After the user of client device 105a selects the image for uploading, application 112 converts the image to grayscale and then crops the image to a defined dimension, aspect ratio, and/or file size that is supported by computing system 115. Next, application 112 sends, at 205, the processed image, a user ID associated with the user of client device 105a, and a company ID representing a company with which the user is associated. Once computing system 115 receives the image, the user ID, and the company ID, imaging manager 120 stores, at 210, the image in image data storage 145 and then, sends, at 220, the user ID and the company ID to token processor 135. Next, imaging manager 120 sends, at 220, text recognition manager 125 a message indicating that the image is ready for processing.

Upon receiving the message, recognition manager 125 accesses, at 225, image data storage 145 to retrieve, at 230, the image. Then, text recognition manager 125 performs a set of OCR operations on the image to extract text from the image. Text recognition manager 125 sends, at 235, the extracted text to machine learning service 130. Once machine learning service 130 receives the text, machine learning service 130 accesses, at 240, ML models storage 150 and retrieves, at 245, a set of ML models configured to predict tokens from text. The set of ML models includes a first ML model from ML models storage 150 configured to predict a type of credit card from text and a second ML model configured to predict a define number of digits of a credit card from text. Machine learning service 130 uses text as input to the first ML model, which predicts a type of the credit card and determines a confidence score associated with the predicted type of credit card. For this example, the first ML model predicted that the type of the credit card used in the transaction is an American Express®. In addition, machine learning service 130 uses the text as input to the second ML model, which predicts the last four digits of the credit card and determines a confidence score associated with the predict last four digits. In this example, the second ML model predicted that the last four digits of the credit card is 1234. Other ML models in the set of ML models include ML models for predicting a date on which the transaction occurred, a location at which the transaction occurred, a total amount, a currency, an expense type, and a vendor. Then, machine learning service 130 sends, at 250, the predicted tokens and associated confidence scores to token processor 135.

When token processor 135 receives the predicted tokens and the confidence scores associated with the tokens, token processor 135 determines a data value for a payment type field of an expense form. To do so, token processor 135 accesses, at 255, user history storage 155 to retrieve, at 260, historical transactions that occurred within the most recent six months, that are associated with the user, and that occurred as part of the user's employment with the company. To retrieve these transactions, token processor 135 sends user history storage 155 a query specifying the six month window of time, the user ID received from imaging manager 120, and the company ID received from imaging manager 120. As such, the results of the query that token processor 135 receives from user history storage 155 include transactions having a transaction date that falls within the six month window of time, a user ID that matches the user ID associated with the user, and a company ID that matches the company ID associated with the user.

The results of the search query can formatted in a different ways in different embodiments. FIG. 3 illustrates an example of historical transactions according to some embodiments. In particular, the historical transactions depicted in FIG. 3 show the formatting used in this example for results of a search query for historical transactions. FIG. 3 illustrates a table 300 of historical transactions that includes seven entries 305-335. Each of the entries 305-335 includes a string formatted with the pattern DDDD-XX-YY:N where DDDD represents the last four digits of a credit card, XX represents the predicted type of credit card, YY represents the actual type of credit card, and N represents the number of transactions that occurred within the defined window of time (a six month window of time in this example) that had the same last four digits of a credit card, predicted type of credit card, and actual type of credit card. In this example, AX represents an American Express® corporate credit card, VI represents a Visa® corporate of credit card, and SS represents a personal credit card. Therefore, the string in entry 305 indicates that within the most recent six months, three transactions associated with the user and the company occurred where the last four digits of the credit card used in these transactions is 1234, the predicted type of credit card used is an American Express® corporate credit card, and the actual type of credit card used is an American Express® corporate credit card. As another example, the string in entry 335 indicates that within the most recent six months, two transactions associated with the user and the company occurred where the last four digits of the credit card used in these transactions is 1232, the predicted type of credit card used is a Visa® corporate credit card, and the actual type of credit card used is a personal credit card.

Returning to FIG. 2, once token processor 135 retrieves the historical transactions from user history storage 155, token processor 135 groups the historical transactions into two groups: a first group that includes corporate credit card transactions and a second group that includes personal credit card transactions. FIG. 4 illustrates a first group of the historical transactions illustrated in FIG. 3 according to some embodiments. Specifically, FIG. 4 shows a table 400 that includes a group of historical transactions from table 300 that include corporate credit card transactions. As shown, table 400 includes entries 305-320 because the actual type of credit card used for these transactions are corporate credit card transactions (i.e., the YY value is either AX or VI). FIG. 5 illustrates a second group of the historical transactions illustrated in FIG. 3 according to some embodiments. In particular, FIG. 5 shows a table 400 that includes a group of historical transactions from table 300 that include personal credit card transactions. As shown, table 500 includes entries 325-335 since the actual type of credit card used for these transactions are personal credit card transactions (i.e., the YY value is $$).

Returning to FIG. 2, for each group of transactions, token processor 135 compares each transaction with every other transaction to determine whether any transactions are similar to each other. For this example, token processor 135 uses an approximate string matching technique (e.g., a Levenshtein distance string matching technique) to determine whether two transactions are similar to each other. For transactions that are determined to be similar, token processor 135 selects one of the transactions among the similar transactions and adds the N value of the other similar transactions to the N value of the selected transaction. Then, token processor 135 removes the portion of the string that represents the predicted type of credit card from each of the remaining transactions in the first group. For each of the remaining transactions in the second group, token processor 135 removes the portion of the string that represents the actual type of credit card. Lastly, token processor 135 removes the portion of the string that represents the number of transactions that occurred within the defined window of time.

FIG. 6 illustrates similarity scores for the historical transactions in the first group of historical transactions illustrated in FIG. 4 according to some embodiments. Specifically, FIG. 6 illustrates a table 600 of similarity scores determined using an approximate string matching technique. The similarity score at the intersection of a particular row and a particular column represents the similarity between the string representing the transaction at the particular row and the string representing the transaction at the particular column. For example, the similarity score at the intersection of the second row and the first column is 90, which represents the similarity between the string 1334-AX-AX and the string 1234-AX-AX. As another example, the similarity score at the intersection of the fourth row and the second column is 20, which represents the similarity between the string 1010-VI-VI and the string 1334-AX-AX. In this example, token processor 135 determines transactions are similar if the similarity score is greater than or equal to 50. Here, token processor 135 determines that transactions represented by strings 1234-AX-AX, 1334-AX-AX, and 1254-AX-AX are similar. Referring back to FIG. 4, the transaction represented by the string 1234-AX-AX has the highest N value. Therefore, token processor 135 selects string 1234-AX-AX and adds the N value of strings 1334-AX-AX and 1254-AX-AX to the N value of the selected string.

FIG. 7 illustrates similarity scores for the historical transactions in the second group of historical transactions illustrated in FIG. 5 according to some embodiments. In particular, FIG. 7 depicts a table 700 of similarity scores determined using an approximate string matching technique. The similarity score at the intersection of a particular row and a particular column represents the similarity between the string representing the transaction at the particular row and the string representing the transaction at the particular column. For example, the similarity score at the intersection of the first row and the second column is 30, which represents the similarity between the string 9191-$$-$$ and the string 1234-VI-$$. As another example, the similarity score at the intersection of the third row and the second column is 90, which represents the similarity between the string 1232-VI-$$ and the string 1234-VI-$$. For this example, token processor 135 determines transactions are similar if the similarity score is greater than or equal to 50. As such, token processor 135 determines that transactions represented by strings 1234-VI-$$ and 1232-VI-$$ are similar. Referring back to FIG. 5, the transaction represented by the string 1234-VI-$$ has the highest N value. Hence, token processor 135 selects string 1234-VI-$$ and adds the N value of string 1232-VI-$$ to the N value of the selected string.

Returning to FIG. 2, after determining similar transactions for each group of transactions, token processor 135 calculates confidence scores for the transactions in each group of transactions. In this example, token processor 135 calculates the confidence score for a transaction in a group by dividing its N value by the total N value of all the transactions in the group. FIG. 8 illustrates confidence scores for historical transactions in the first group of historical transactions illustrated in FIG. 4 according to some embodiments. Specifically, FIG. 8 shows a table 800 of transactions in the first group, after similar transactions are combined, and their corresponding confidence scores. As described by reference to FIG. 6, token processor 135 determined that transactions represented by strings 1234-AX-AX, 1334-AX-AX, and 1254-AX-AX are similar. Token processor 135 selected string 1234-AX-AX and added the N value of strings 1334-AX-AX and 1254-AX-AX to the N value of the selected string. As shown, token processor 135 removed the portion of the string that represents the predicted type of credit card from each of the transactions and the portion of the string that represents the number of transactions that occurred within the defined window of time. To calculate the confidence score for string 1234-AX-AX, token processor 135 divides its N value (6 in this example) by the total N value of all the transactions in the first group (6+2=8 in this example), which is 0.75. Token processor 135 calculates the confidence score for the string 1010-VI-VI in a similar manner (2/8=0.25 in this example). FIG. 9 illustrates confidence scores for historical transactions in the second group of historical transactions illustrated in FIG. 5 according to some embodiments. In particular, FIG. 9 shows a table 900 of transactions in the second group, after similar transactions are combined, and their corresponding confidence scores. As described by reference to FIG. 7, token processor 135 determined that transactions represented by strings 1234-VI-$$ and 1232-VI-$$ are similar. Token processor 135 selected string 1234-VI-$$ and added the N value of string 1232-VI-$$ to the N value of the selected string. As shown, token processor 135 removed the portion of the string that represents the actual type of credit card from each of the transactions and the portion of the string that represents the number of transactions that occurred within the defined window of time. Token processor 135 calculates the confidence scores for each transaction in the same manner described above by reference to FIG. 8.

Returning to FIG. 2, after determining similar transactions and calculating confidence scores for each group of transactions, token processor 135 selects the transaction from each group that has the highest confidence score. For this example, token processor 135 selects the first transaction shown in table 800 for the first group of transactions and selects the second transaction shown in table 900 for the second group of transactions. Next, token processor 135 compares the types of credit cards of the selected transactions with the predicted type of credit card used in the transaction. As explained above, in this example, the predicted type of the credit card used in the transaction is an American Express®. Using AX to represent an American Express® type of credit card, token processor 135 determines whether the predicted type of the credit card matches type of the credit card used in the transaction from the second group having the highest confidence score. If the strings match, token processor 135 determines that the data value for the payment type field is "personal credit card". If not, token processor 135 determines whether the predicted type of the credit card matches type of the credit card used in the transaction from the first group having the highest confidence score. If the strings match in this case, token processor 135 determines that the data value for the payment type field is "corporate credit card". In this example, the predicted type of the credit card matches type of the credit card used in the transaction from the first group having the highest confidence score. As such, token processor 135 would determine that the data value for the payment type field is "corporate credit card". If the strings do not match in this case, token processor 135 proceeds to determine the data value for the payment type field based on the last four digits.

As described above, the predicted last four digits of the credit card used in the transaction is 1234. To determine the data value for the payment type field based on the last four digits, token processor 135 determines whether the predicted last four digits of the credit card matches the last four digits of the credit card used in the transaction from the first group having the highest confidence score. In some embodiments, token processor 135 determines that they match if they are an exact match. In other embodiments, token processor 135 determines that they match if a defined portion of the digits (e.g., 75% or 3 out of the 4 digits) match. If token processor 135 determines the predicted last four digits of the credit card matches the last four digits of the credit card used in the transaction from the first group and the confidence score associated with the predicted last four digits is greater than a threshold amount (e.g., 0.8, 0.9, 0.95), token processor 135 determines that the data value for the payment type field is "corporate credit card". If the last four digits do not match or the confidence score associated with the predicted last four digits is not greater than the threshold amount, token processor 135 determines whether the predicted last four digits of the credit card matches the last four digits of the credit card used in the transaction from the second group having the highest confidence score. In some embodiments, token processor 135 determines that they match if they are an exact match. In other embodiments, token processor 135 determines that they match if a defined portion of the digits (e.g., 75% or 3 out of the 4 digits) match. If token processor 135 determines the predicted last four digits of the credit card matches the last four digits of the credit card used in the transaction from the second group and the confidence score associated with the predicted last four digits is greater than the threshold amount, token processor 135 determines that the data value for the payment type field is "personal credit card". Otherwise, token processor 135 proceeds to determine the data value for the payment type field based on permutations of card types and last four digits.

When token processor 135 cannot determine the data value for the payment type field based on the last four digits of transactions, token processor 135 generates three strings based on the type of a credit card and the last four digits of the credit card. In particular, token processor 135 generates a first string by concatenating the predicted the last four digits of the credit card used in the transaction with the predicted type of the credit card and using a defined set of special characters separating the values. For this example, token processor 135 uses two colons ("::") to separate the values. Thus, the first string that token processor 135 generates is "1234::AX". Token processor 135 generates the second and third strings in a similar manner using the transaction from the first group having the highest confidence score and the transaction from the second group having the highest confidence score. In this example, the second string generated by token processor 135 is "1234::AX" and "1234::VI," respectively. Next, token processor 135 uses an approximate string matching technique (e.g., a Levenshtein distance string matching technique) to determine the similarity between the first string and the second string and to determine the similarity between the first string and the third string. If the first string and the second string are more similar than the first string and the third string (e.g., the similarity score between the first string and the second string is higher than the similarity score between the first string and the third string), token processor 135 generates a table with all possible permutations of types of credit card and last four digits using the first string and the second string and calculates confidence scores for each permutation. Token processor 135 selects the permutation in the table with the highest confidence score and determines the data value for the payment type field based on the selected permutation.

FIG. 10 illustrates an example of permutations of strings and digits according to some embodiments. Specifically, FIG. 10 illustrates a table 1000 that includes all possible permutations of types of credit card and last four digits using the first string and the second string and formulas for calculating the confidence scores for each corresponding permutation. As shown, table 1000 includes a first permutation specifying the type of credit card from the second string and the last four digits from the second string, a second permutation specifying the type of credit card from the second string and the predicted last four digits from the first string, a third permutation specifying the predicted type of credit card from the first string and the last four digits from the second string, and a fourth permutation specifying the predicted type of credit card from the first string and the predicted last four digits from the first string. Here, the confidence score associated with the type of credit card from the second string is the confidence score calculated for transactions in the first group described above by reference to FIGS. 2 and 8. Thus, the confidence score for the first permutation is calculated by multiplying the confidence score associated with the transaction having the highest confidence score in the first group by, again, the confidence score associated with the transaction having the highest confidence score in the first group. The confidence score for the second permutation is calculated by multiplying the confidence score associated with the transaction having the highest confidence score in the first group by the confidence score associated with the predicted last four digits. The confidence score for the third permutation is calculated by multiplying the confidence score associated with the predicted type of credit card by the confidence score associated with the transaction having the highest confidence score in the first group. The confidence score for the third permutation is calculated by multiplying the confidence score associated with the predicted type of credit card by the confidence score associated with the predicted last four digits.

On the other hand, if the first string and the third string are more similar than the first string and the second string (e.g., the similarity score between the first string and the third string is higher than the similarity score between the first string and the second string), token processor 135 generates a table with all possible permutations of types of credit card and last four digits using the first string and the third string and calculates confidence scores for each permutation. Token processor 135 selects the permutation in the table with the highest confidence score and determines the data value for the payment type field based on the selected permutation. For example, if the type of credit card specified in selected permutation is from the third string, token processor 135 determines that the data value for the payment type field is "personal credit card". However, if the type of credit card specified in selected permutation is from the first string, token processor 135 determines that the data value for the payment type field is "corporate credit card".

FIG. 11 illustrates another example of permutations of strings and digits according to some embodiments. In particular, FIG. 11 illustrates a table 1100 that includes all possible permutations of types of credit card and last four digits using the first string and the third string and formulas for calculating the confidence scores for each corresponding permutation. As depicted, table 1100 includes a first permutation specifying the type of credit card from the third string and the last four digits from the third string, a second permutation specifying the type of credit card from the third string and the predicted last four digits from the first string, a third permutation specifying the predicted type of credit card from the first string and the last four digits from the third string, and a fourth permutation specifying the predicted type of credit card from the first string and the predicted last four digits from the first string. In this example, the confidence score associated with the type of credit card from the third string is the confidence score calculated for transactions in the second group described above by reference to FIGS. 2 and 9. Hence, the confidence score for the first permutation is calculated by multiplying the confidence score associated with the transaction having the highest confidence score in the second group by, again, the confidence score associated with the transaction having the highest confidence score in the second group. The confidence score for the second permutation is calculated by multiplying the confidence score associated with the transaction having the highest confidence score in the second group by the confidence score associated with the predicted last four digits. The confidence score for the third permutation is calculated by multiplying the confidence score associated with the predicted type of credit card by the confidence score associated with the transaction having the highest confidence score in the second group. The confidence score for the third permutation is calculated by multiplying the confidence score associated with the predicted type of credit card by the confidence score associated with the predicted last four digits.

Returning to FIG. 2, after token processor 135 determines the data value for the payment type field of the expense form, token processor 135 can determined data values for other fields in the expense form. Next, token processor 135 generates the expense form, which may include a payment type field, a date field, a location field, a total amount field, a currency field, an expense type field, and a vendor field. Token processor 135 fills in the payment type field with the data value determined using the techniques described herein. Token processor 135 may also fill some or all of the other fields in the form with corresponding determined data values. Once token processor 135 finishes pre-filling fields in the form, token processor 135 sends, at 265, the form to client device 105a.

FIG. 12 illustrates an example graphical user interface (GUI) 1200 that includes an expense form according to some embodiments. In particular, the expense form in GUI 1200 is an example of a form that token processor 135 generates and sends to client device 105a. As shown, GUI 1200 five selectable and editable fields 1205-1225 and selectable user interface (UI) item 1230. Field 1205 is for specifying an amount associated with the transaction, field 1210 is for specifying an expense type associated with the transaction, field 1215 is for specifying a date on which the transaction occurred, field 1220 is for specifying a name of a vendor associated with the transaction, and field 1225 is for specifying a location at which the transaction occurred. For this example, a payment type field and a currency field are not shown because these fields and their data values hidden from view of the user of client device 105a. However, the fields and data values are stored in the form. UI item 1230 is configured to, when selected, transmit the data values specified for fields 1205-1230 and the data values for the hidden payment type and currency fields to computing system 115.

Returning to FIG. 2, once the user of client device 105a sends, at 270, data values for fields in the expense form to computing system 115, expense manager 140 generates a record and populates attributes in the record with corresponding data values from fields in the expense form. For instance, the record may include a date on which the transaction occurred, a location at which the transaction occurred, a set of items, a total amount, a currency, an expense type, a vendor, a type of credit card used to purchase the set of items, and the last four digits of the credit card used to purchase the set of items. In such cases, expense manager 140 populates these attributes with the data values for the corresponding fields in the expense form. Next, expense manager 140 stores, at 275, the record in expense data storage 160. Additionally, expense manager 140 generates a transaction record, which includes a date on which the transaction occurred, a predicted type of credit card, and an actual type of credit card used for the transaction, a predicted last four digits of the credit card, a user ID, and a company ID, and stores, at 280, the record in user history storage 155.

As mentioned above, expense manager 140 may handle requests for expense data. For example, after expense manager 140 creates a record for the transaction and stores the record in expense data storage 160, computing system 115 can receive a request for the expense record from client device 105a via a web tool provided by computing system 115. In response to the request, expense manager 140 accesses expense data storage 160, retrieves the requested expense record, and provides it to client device 105a via the web tool. FIG. 13 illustrates an example GUI 1300 of a web tool according to some embodiments. As shown, GUI 1300 depicts a "Details" page of the web tool that provides the data values of the attributes in the expense record. Specifically, the data values are provided via fields 1305-1335. Field 1305 provides an expense type field, field 1310 provides a transaction date field, field 1315 provides a vendor name field, field 1320 provides a payment type field, field 1325 provides an amount field, field 1330 provides a location field, and field 1335 provides a currency field. Here, the fields provided by GUI 1300 via the web tool shows the payment type field and the currency field, which were hidden in the form provided by GUI 1200.

Figure 14:
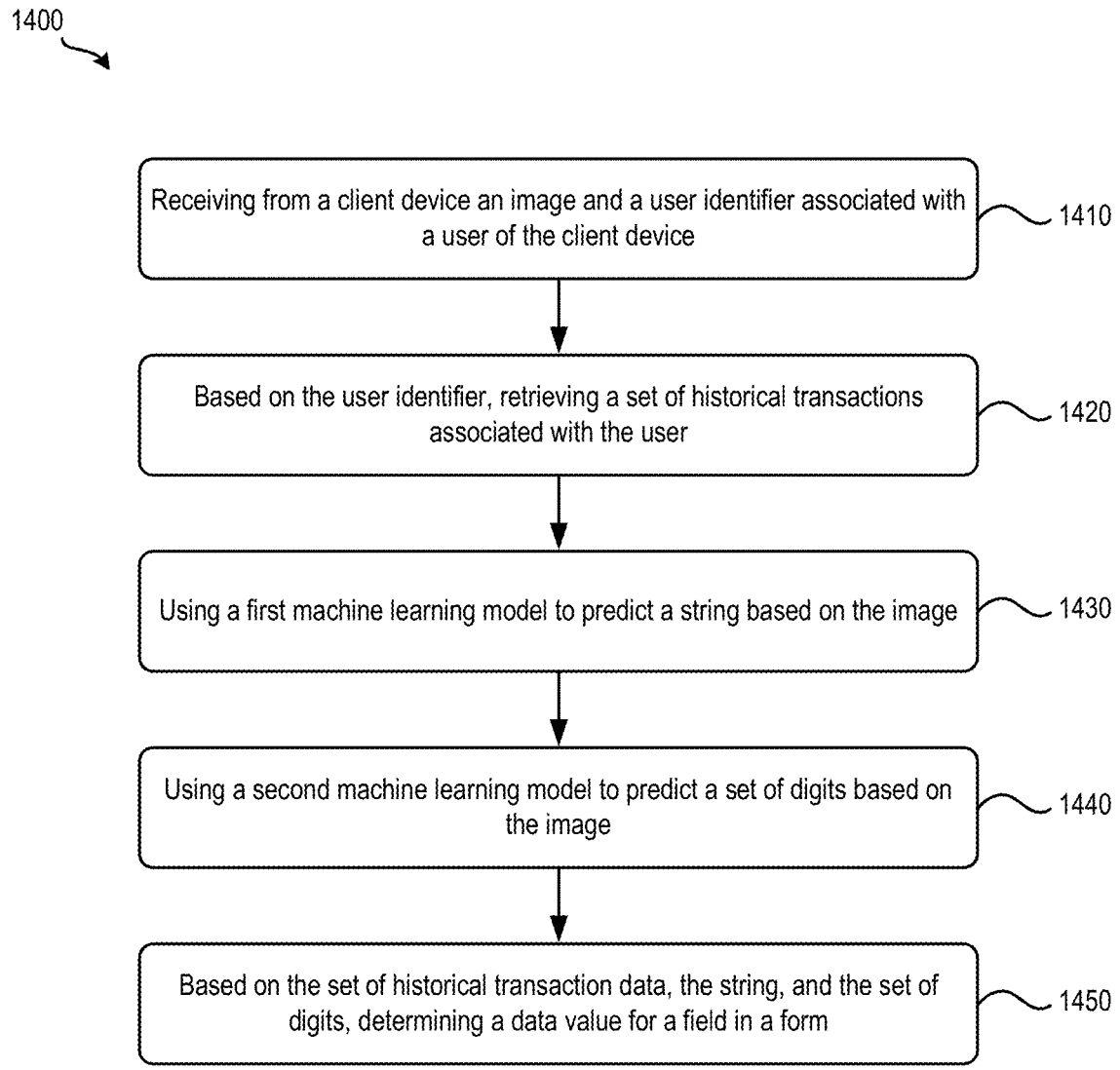
FIG. 14 illustrates a process for determining a data value for a field according to some embodiments.

FIG. 14 illustrates a process 1400 for determining a data value for a field according to some embodiments. In some embodiments, computing system 115 performs process 1400. Process 1400 begins by receiving, at 1410, from a client device an image and a user identifier associated with a user of the client device. Referring to FIG. 2 as an example, computing system 115 may receive the image and the user identifier associated with a user from the user of client device 105a.

Next, based on the user identifier, process 1400 retrieves, at 1420, a set of historical transactions associated with the user. Referring to FIG. 2 as an example, token processor 135 may access user history storage 155 to retrieve, based on the user identifier, historical transactions that occurred within a defined window of time and that are associated with the user. Process 1400 then uses, at 1430, a first machine learning model to predict a string based on the image. Referring to FIG. 2 as an example, machine learning service 130 retrieves a first ML model from ML models storage 150 that is configured to predict a type of credit card from text and uses it to predict a type of credit card based on text extracted from the image.

At 1440, process 1400 uses a second machine learning model to predict a set of digits based on the image. Referring to FIG. 2 as an example, machine learning service 130 retrieves a second ML model from ML models storage 150 that is configured to predict predicts the last four digits of a credit card from text and uses it to predict the last four digits of a credit card based on text extracted from the image. Finally, process 1400 determines, at 1450, a data value for a field in a form based on the set of historical transaction data, the string, and the set of digits. Referring to FIG. 2 as an example, token processor 135 determines a data value for a payment type field in an expense form based on the set of historical transaction data, the predicted type of credit card, and the predicted last four digits of the credit card.

Figure 15:
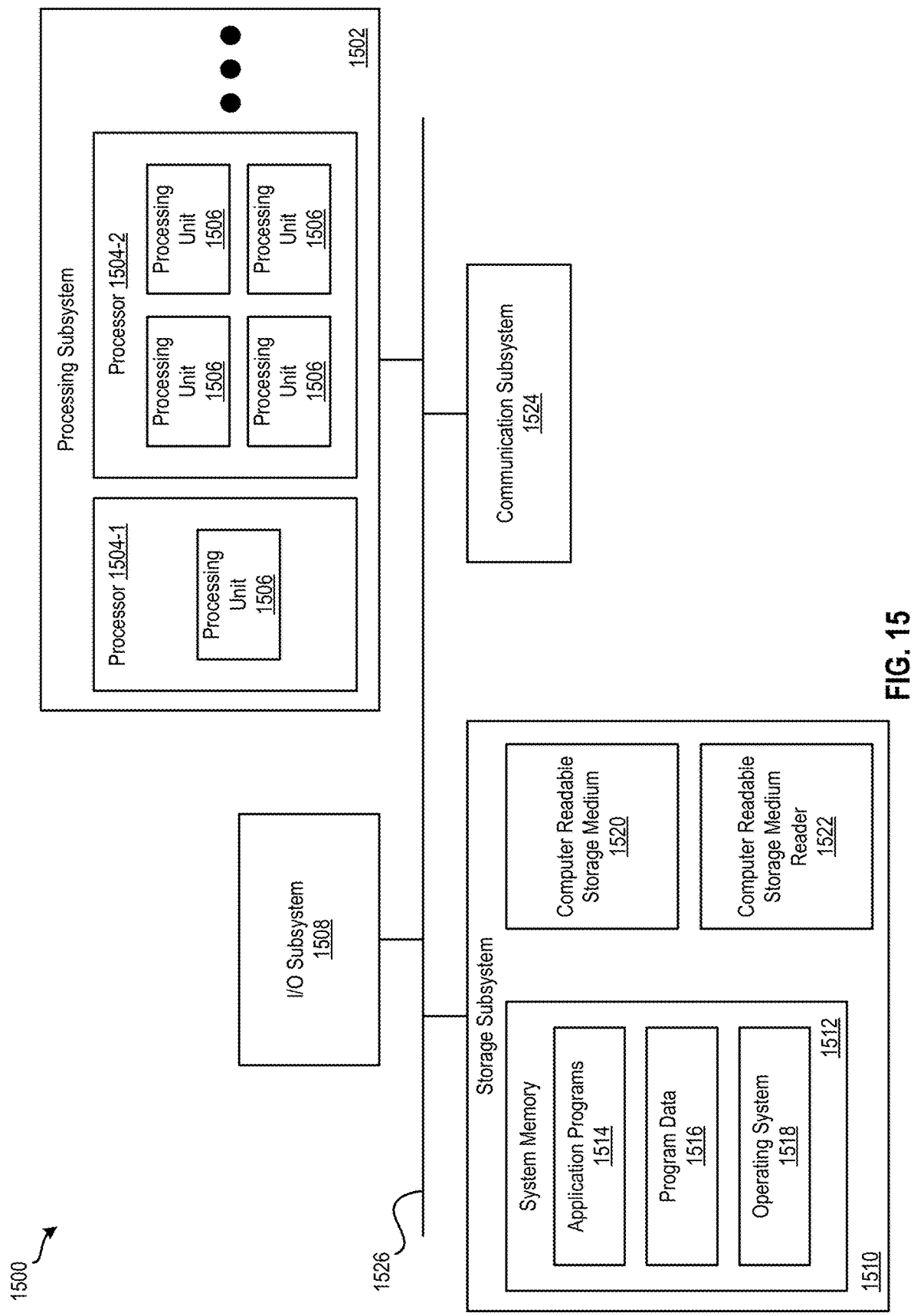
FIG. 15 illustrates an exemplary computer system, in which various embodiments may be implemented.

FIG. 15 illustrates an exemplary computer system 1500 for implementing various embodiments described above. For example, computer system 1500 may be used to implement client devices 105a-n and computing system 115. Computer system 1500 may be a desktop computer, a laptop, a server computer, or any other type of computer system or combination thereof. Some or all elements of imaging manager 120, text recognition manager 125, machine learning service 130, token processor 135, expense manager 140, or combinations thereof can be included or implemented in computer system 1500. In addition, computer system 1500 can implement many of the operations, methods, and/or processes described above (e.g., process 1400). As shown in FIG. 15, computer system 1500 includes processing subsystem 1502, which communicates, via bus subsystem 1526, with input/output (I/O) subsystem 1508, storage subsystem 1510 and communication subsystem 1524.

Bus subsystem 1526 is configured to facilitate communication among the various components and subsystems of computer system 1500. While bus subsystem 1526 is illustrated in FIG. 15 as a single bus, one of ordinary skill in the art will understand that bus subsystem 1526 may be implemented as multiple buses. Bus subsystem 1526 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1502, which can be implemented as one or more integrated circuits (e.g., a conventional microprocessor or microcontroller), controls the operation of computer system 1500. Processing subsystem 1502 may include one or more processors 1504. Each processor 1504 may include one processing unit 1506 (e.g., a single core processor such as processor 1504-1) or several processing units 1506 (e.g., a multicore processor such as processor 1504-2). In some embodiments, processors 1504 of processing subsystem 1502 may be implemented as independent processors while, in other embodiments, processors 1504 of processing subsystem 1502 may be implemented as multiple processors integrate into a single chip or multiple chips. Still, in some embodiments, processors 1504 of processing subsystem 1502 may be implemented as a combination of independent processors and multiple processors integrated into a single chip or multiple chips.

In some embodiments, processing subsystem 1502 can execute a variety of programs or processes in response to program code and can maintain multiple concurrently executing programs or processes. At any given time, some or all of the program code to be executed can reside in processing subsystem 1502 and/or in storage subsystem 1510. Through suitable programming, processing subsystem 1502 can provide various functionalities, such as the functionalities described above by reference to process 1400.

I/O subsystem 1508 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1500 to a user or another device (e.g., a printer).

As illustrated in FIG. 15, storage subsystem 1510 includes system memory 1512, computer-readable storage medium 1520, and computer-readable storage medium reader 1522. System memory 1512 may be configured to store software in the form of program instructions that are loadable and executable by processing subsystem 1502 as well as data generated during the execution of program instructions. In some embodiments, system memory 1512 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1512 may include different types of memory, such as static random access memory (SRAM) and/or dynamic random access memory (DRAM). System memory 1512 may include a basic input/output system (BIOS), in some embodiments, that is configured to store basic routines to facilitate transferring information between elements within computer system 1500 (e.g., during start-up). Such a BIOS may be stored in ROM (e.g., a ROM chip), flash memory, or any other type of memory that may be configured to store the BIOS.

As shown in FIG. 15, system memory 1512 includes application programs 1514, program data 1516, and operating system (OS) 1518. OS 1518 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1520 may be a non-transitory computer-readable medium configured to store software (e.g., programs, code modules, data constructs, instructions, etc.). Many of the components (e.g., imaging manager 120, text recognition manager 125, machine learning service 130, token processor 135, and expense manager 140) and/or processes (e.g., process 1400) described above may be implemented as software that when executed by a processor or processing unit (e.g., a processor or processing unit of processing subsystem 1502) performs the operations of such components and/or processes. Storage subsystem 1510 may also store data used for, or generated during, the execution of the software.

Storage subsystem 1510 may also include computer-readable storage medium reader 1522 that is configured to communicate with computer-readable storage medium 1520. Together and, optionally, in combination with system memory 1512, computer-readable storage medium 1520 may comprehensively represent remote, local, fixed, and/or removable storage devices plus storage media for temporarily and/or more permanently containing, storing, transmitting, and retrieving computer-readable information.

Computer-readable storage medium 1520 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1524 serves as an interface for receiving data from, and transmitting data to, other devices, computer systems, and networks. For example, communication subsystem 1524 may allow computer system 1500 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1524 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1524 may provide components configured for wired communication (e.g., Ethernet) in addition to or instead of components configured for wireless communication.

One of ordinary skill in the art will realize that the architecture shown in FIG. 15 is only an example architecture of computer system 1500, and that computer system 1500 may have additional or fewer components than shown, or a different configuration of components. The various components shown in FIG. 15 may be implemented in hardware, software, firmware or any combination thereof, including one or more signal processing and/or application specific integrated circuits.

Figure 16:
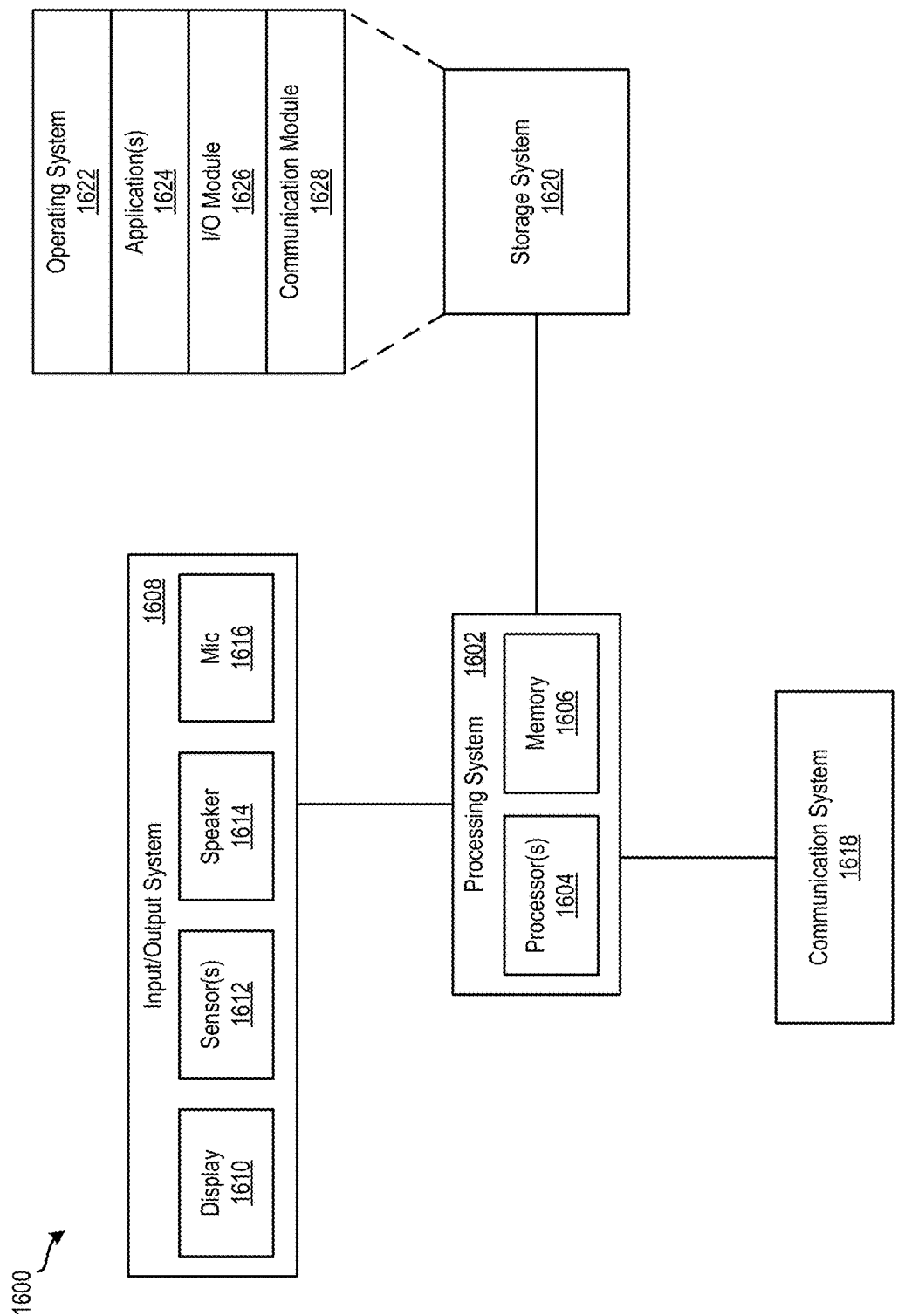
FIG. 16 illustrates an exemplary computing device, in which various embodiments may be implemented.

FIG. 16 illustrates an exemplary computing device 1600 for implementing various embodiments described above. For example, computing device 1600 may be used to implement client devices 105a-n. Computing device 1600 may be a cellphone, a smartphone, a wearable device, an activity tracker or manager, a tablet, a personal digital assistant (PDA), a media player, or any other type of mobile computing device or combination thereof. Some or all elements of image capture device 110, application 112, web browser 114, or combinations thereof can be included or implemented in computing device 1600. As shown in FIG. 16, computing device 1600 includes processing system 1602, input/output (I/O) system 1608, communication system 1618, and storage system 1620. These components may be coupled by one or more communication buses or signal lines.

Processing system 1602, which can be implemented as one or more integrated circuits (e.g., a conventional microprocessor or microcontroller), controls the operation of computing device 1600. As shown, processing system 1602 includes one or more processors 1604 and memory 1606. Processors 1604 are configured to run or execute various software and/or sets of instructions stored in memory 1606 to perform various functions for computing device 1600 and to process data.

Each processor of processors 1604 may include one processing unit (e.g., a single core processor) or several processing units (e.g., a multicore processor). In some embodiments, processors 1604 of processing system 1602 may be implemented as independent processors while, in other embodiments, processors 1604 of processing system 1602 may be implemented as multiple processors integrate into a single chip. Still, in some embodiments, processors 1604 of processing system 1602 may be implemented as a combination of independent processors and multiple processors integrated into a single chip.

Memory 1606 may be configured to receive and store software (e.g., operating system 1622, applications 1624, I/O module 1626, communication module 1628, etc. from storage system 1620) in the form of program instructions that are loadable and executable by processors 1604 as well as data generated during the execution of program instructions. In some embodiments, memory 1606 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1608 is responsible for receiving input through various components and providing output through various components. As shown for this example, I/O system 1608 includes display 1610, one or more sensors 1612, speaker 1614, and microphone 1616. Display 1610 is configured to output visual information (e.g., a graphical user interface (GUI) generated and/or rendered by processors 1604). In some embodiments, display 1610 is a touch screen that is configured to also receive touch-based input. Display 1610 may be implemented using liquid crystal display (LCD) technology, light-emitting diode (LED) technology, organic LED (OLED) technology, organic electro luminescence (OEL) technology, or any other type of display technologies. Sensors 1612 may include any number of different types of sensors for measuring a physical quantity (e.g., temperature, force, pressure, acceleration, orientation, light, radiation, etc.). Speaker 1614 is configured to output audio information and microphone 1616 is configured to receive audio input. One of ordinary skill in the art will appreciate that I/O system 1608 may include any number of additional, fewer, and/or different components. For instance, I/O system 1608 may include a keypad or keyboard for receiving input, a port for transmitting data, receiving data and/or power, and/or communicating with another device or component, an image capture component for capturing photos and/or videos, etc.

Communication system 1618 serves as an interface for receiving data from, and transmitting data to, other devices, computer systems, and networks. For example, communication system 1618 may allow computing device 1600 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1618 can include any number of different communication components.

Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1618 may provide components configured for wired communication (e.g., Ethernet) in addition to or instead of components configured for wireless communication.

Storage system 1620 handles the storage and management of data for computing device 1600. Storage system 1620 may be implemented by one or more non-transitory machine-readable mediums that are configured to store software (e.g., programs, code modules, data constructs, instructions, etc.) and store data used for, or generated during, the execution of the software. Many of the components (e.g., image capture device 110, application 112, and web browser 114) described above may be implemented as software that when executed by a processor or processing unit (e.g., processors 1604 of processing system 1602) performs the operations of such components and/or processes.

In this example, storage system 1620 includes operating system 1622, one or more applications 1624, I/O module 1626, and communication module 1628. Operating system 1622 includes various procedures, sets of instructions, software components and/or drivers for controlling and managing general system tasks (e.g., memory management, storage device control, power management, etc.) and facilitates communication between various hardware and software components. Operating system 1622 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1624 can include any number of different applications installed on computing device 1600. For example, application 112 and web browser 114 may be installed on computing device 1600. Other examples of such applications may include an address book application, a contact list application, an email application, an instant messaging application, a word processing application, JAVA-enabled applications, an encryption application, a digital rights management application, a voice recognition application, location determination application, a mapping application, a music player application, etc.

I/O module 1626 manages information received via input components (e.g., display 1610, sensors 1612, and microphone 1616) and information to be outputted via output components (e.g., display 1610 and speaker 1614). Communication module 1628 facilitates communication with other devices via communication system 1618 and includes various software components for handling data received from communication system 1618.

One of ordinary skill in the art will realize that the architecture shown in FIG. 16 is only an example architecture of computing device 1600, and that computing device 1600 may have additional or fewer components than shown, or a different configuration of components. The various components shown in FIG. 16 may be implemented in hardware, software, firmware or any combination thereof, including one or more signal processing and/or application specific integrated circuits.

Figure 17:
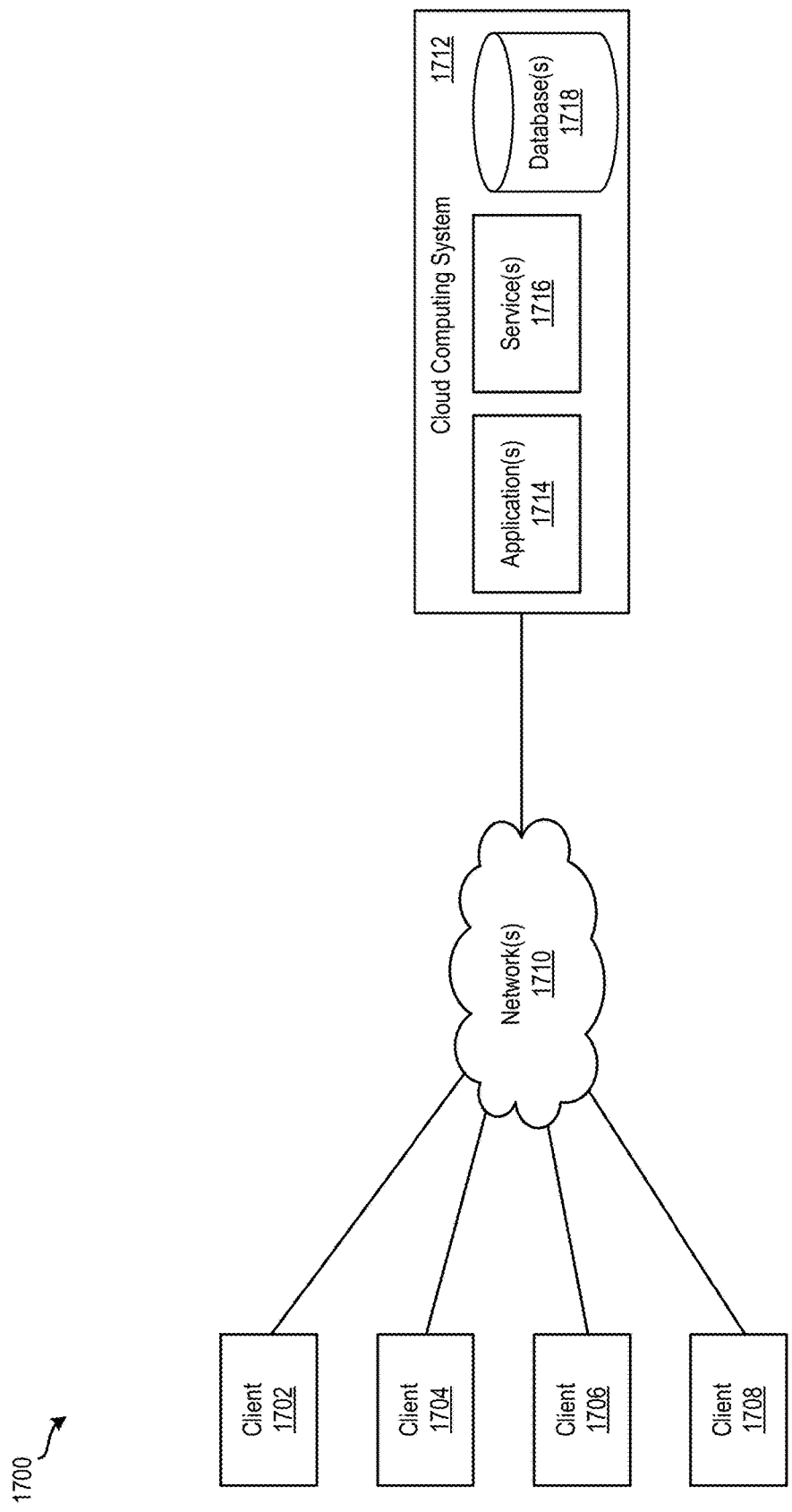
FIG. 17 illustrates an exemplary system, in which various embodiments may be implemented.

FIG. 17 illustrates an exemplary system 1700 for implementing various embodiments described above. For example, client devices 1702-1708 may be used to implement client devices 105a-n and cloud computing system 1712 may be used to implement computing system 115. As shown, system 1700 includes client devices 1702-1708, one or more networks 1710, and cloud computing system 1712. Cloud computing system 1712 is configured to provide resources and data to client devices 1702-1708 via networks 1710. In some embodiments, cloud computing system 1700 provides resources to any number of different users (e.g., customers, tenants, organizations, etc.). Cloud computing system 1712 may be implemented by one or more computer systems (e.g., servers), virtual machines operating on a computer system, or a combination thereof.

As shown, cloud computing system 1712 includes one or more applications 1714, one or more services 1716, and one or more databases 1718. Cloud computing system 1700 may provide applications 1714, services 1716, and databases 1718 to any number of different customers in a self-service, subscription-based, elastically scalable, reliable, highly available, and secure manner.

In some embodiments, cloud computing system 1700 may be adapted to automatically provision, manage, and track a customer's subscriptions to services offered by cloud computing system 1700. Cloud computing system 1700 may provide cloud services via different deployment models. For example, cloud services may be provided under a public cloud model in which cloud computing system 1700 is owned by an organization selling cloud services and the cloud services are made available to the general public or different industry enterprises. As another example, cloud services may be provided under a private cloud model in which cloud computing system 1700 is operated solely for a single organization and may provide cloud services for one or more entities within the organization. The cloud services may also be provided under a community cloud model in which cloud computing system 1700 and the cloud services provided by cloud computing system 1700 are shared by several organizations in a related community. The cloud services may also be provided under a hybrid cloud model, which is a combination of two or more of the aforementioned different models.

In some instances, any one of applications 1714, services 1716, and databases 1718 made available to client devices 1702-1708 via networks 1710 from cloud computing system 1700 is referred to as a "cloud service." Typically, servers and systems that make up cloud computing system 1700 are different from the on-premises servers and systems of a customer. For example, cloud computing system 1700 may host an application and a user of one of client devices 1702-1708 may order and use the application via networks 1710.

Applications 1714 may include software applications that are configured to execute on cloud computing system 1712 (e.g., a computer system or a virtual machine operating on a computer system) and be accessed, controlled, managed, etc. via client devices 1702-1708. In some embodiments, applications 1714 may include server applications and/or mid-tier applications (e.g., HTTP (hypertext transport protocol) server applications, FTP (file transfer protocol) server applications, CGI (common gateway interface) server applications, JAVA server applications, etc.). Services 1716 are software components, modules, application, etc. that are configured to execute on cloud computing system 1712 and provide functionalities to client devices 1702-1708 via networks 1710. Services 1716 may be web-based services or on-demand cloud services.

Databases 1718 are configured to store and/or manage data that is accessed by applications 1714, services 1716, and/or client devices 1702-1708. For instance, storages 145-160 may be stored in databases 1718. Databases 1718 may reside on a non-transitory storage medium local to (and/or resident in) cloud computing system 1712, in a storage-area network (SAN), on a non-transitory storage medium local located remotely from cloud computing system 1712. In some embodiments, databases 1718 may include relational databases that are managed by a relational database management system (RDBMS). Databases 1718 may be a column-oriented databases, row-oriented databases, or a combination thereof. In some embodiments, some or all of databases 1718 are in-memory databases. That is, in some such embodiments, data for databases 1718 are stored and managed in memory (e.g., random access memory (RAM)).

Client devices 1702-1708 are configured to execute and operate a client application (e.g., a web browser, a proprietary client application, etc.) that communicates with applications 1714, services 1716, and/or databases 1718 via networks 1710. This way, client devices 1702-1708 may access the various functionalities provided by applications 1714, services 1716, and databases 1718 while applications 1714, services 1716, and databases 1718 are operating (e.g., hosted) on cloud computing system 1700. Client devices 1702-1708 may be computer system 1500 or computing device 1600, as described above by reference to FIGS. 15 and 16, respectively. Although system 1700 is shown with four client devices, any number of client devices may be supported.

Networks 1710 may be any type of network configured to facilitate data communications among client devices 1702-1708 and cloud computing system 1712 using any of a variety of network protocols. Networks 1710 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:

receiving from a client device an image and a user identifier associated with a user of the client device;

based on the user identifier, retrieving a set of historical transactions associated with the user;

using a first machine learning model to predict a string based on the image;

using a second machine learning model to predict a set of digits based on the image, wherein the first machine learning model and the second machine learning model are different machine learning models; and based on the set of historical transaction data, the string, and the set of digits, determining a data value for a field in a form.

2. The non-transitory machine-readable medium of claim 1, wherein the program further comprises sets of instructions for:

generating the form that includes the field; and providing the client device the form with the field automatically set to the determined data value.

3. The non-transitory machine-readable medium of claim 2, wherein the form further comprises a set of fields, wherein the program further comprises set of instructions for:

receiving from the client a set of data values for the set of fields and a request to create a record based on the data value for the field and the set of data values for the set of fields;

in response to the request, creating the record; and storing the record in a storage.

4. The non-transitory machine-readable medium of claim 1, wherein each historical transaction the set of historical transactions comprises a set of digits, a predicted string, an actual string, and a number of past transactions having the set of digits, the predicted string, and the actual string, wherein determining the data value for a field in the form comprises:

grouping the set of historical transactions into a first group of historical transactions and a second group of historical transactions based on the actual strings of the set of historical transactions;

determining a first historical transaction from the first group of historical transactions;

determining a first score associated with the first historical transaction;

determining a second historical transaction from the second group of historical transactions;

determining a second score associated with the second historical transaction; and determining whether the actual string of the first historical transaction matches the string predicted based on the image.

5. The non-transitory machine-readable medium of claim 4, wherein determining the data value for a field in the form further comprises:

upon determining that the actual string of the first historical transaction does match the string predicted based on the image, determining a first data value as the data value for the field in the form; and upon determining that the actual string of the first historical transaction does not match the string predicted based on the image, determining whether the actual string of the second historical transaction matches the string predicted based on the image.

6. The non-transitory machine-readable medium of claim 5, wherein determining the data value for a field in the form further comprises:

upon determining that the actual string of the second historical transaction does match the string predicted based on the image, determining a second data value as the data value for the field in the form; and upon determining that the actual string of the second historical transaction does not match the string predicted based on the image, determining whether the set of digits of the first historical transaction matches the set of digits predicted based on the image.

7. The non-transitory machine-readable medium of claim 1, wherein the program further comprises a set of instructions for receiving from the client device a company identifier representing a company with which the user of the client device is associated, wherein retrieving the set of historical transaction data associated with the user is further based on the company identifier.

8. A method comprising:
receiving from a client device an image and a user identifier associated with a user of the client device;
based on the user identifier, retrieving a set of historical transactions associated with the user;
using a first machine learning model to predict a string based on the image;
using a second machine learning model to predict a set of digits based on the image, wherein the first machine learning model and the second machine learning model are different machine learning models; and
based on the set of historical transaction data, the string, and the set of digits, determining a data value for a field in a form.

9. The method of claim 8 further comprising:
generating the form that includes the field; and
providing the client device the form with the field automatically set to the determined data value.

10. The method of claim 9, wherein the form further comprises a set of fields, wherein the method further comprises:
receiving from the client a set of data values for the set of fields and a request to create a record based on the data value for the field and the set of data values for the set of fields;
in response to the request, creating the record; and
storing the record in a storage.

11. The method of claim 1, wherein each historical transaction the set of historical transactions comprises a set of digits, a predicted string, an actual string, and a number of past transactions having the set of digits, the predicted string, and the actual string, wherein determining the data value for a field in the form comprises:
grouping the set of historical transactions into a first group of historical transactions and a second group of historical transactions based on the actual strings of the set of historical transactions;
determining a first historical transaction from the first group of historical transactions;
determining a first score associated with the first historical transaction;
determining a second historical transaction from the second group of historical transactions;
determining a second score associated with the second historical transaction; and
determining whether the actual string of the first historical transaction matches the string predicted based on the image.

12. The method of claim 11, wherein determining the data value for a field in the form further comprises:
upon determining that the actual string of the first historical transaction does match the string predicted based on the image, determining a first data value as the data value for the field in the form; and
upon determining that the actual string of the first historical transaction does not match the string predicted based on the image, determining whether the actual string of the second historical transaction matches the string predicted based on the image.

13. The method of claim 12, wherein determining the data value for a field in the form further comprises:
upon determining that the actual string of the second historical transaction does match the string predicted based on the image, determining a second data value as the data value for the field in the form; and
upon determining that the actual string of the second historical transaction does not match the string predicted based on the image, determining whether the set of digits of the first historical transaction matches the set of digits predicted based on the image.

14. The method of claim 8 further comprising receiving from the client device a company identifier representing a company with which the user of the client device is associated, wherein retrieving the set of historical transaction data associated with the user is further based on the company identifier.

15. A system comprising:
a set of processing units; and
a non-transitory machine-readable medium storing instructions that when executed by at least one processing unit in the set of processing units cause the at least one processing unit to:
receive from a client device an image and a user identifier associated with a user of the client device;
based on the user identifier, retrieve a set of historical transactions associated with the user;
use a first machine learning model to predict a string based on the image;
use a second machine learning model to predict a set of digits based on the image, wherein the first machine learning model and the second machine learning model are different machine learning models; and
based on the set of historical transaction data, the string, and the set of digits, determine a data value for a field in a form.

16. The system of claim 15, wherein the instructions further cause the at least one processing unit to:
generate the form that includes the field; and
provide the client device the form with the field automatically set to the determined data value.

17. The system of claim 16, wherein the form further comprises a set of fields, wherein the instructions further cause the at least one processing unit to:
receive from the client a set of data values for the set of fields and a request to create a record based on the data value for the field and the set of data values for the set of fields;
in response to the request, create the record; and
store the record in a storage.

18. The system of claim 15, wherein each historical transaction the set of historical transactions comprises a set of digits, a predicted string, an actual string, and a number of past transactions having the set of digits, the predicted string, and the actual string, wherein determining the data value for a field in the form comprises:
grouping the set of historical transactions into a first group of historical transactions and a second group of historical transactions based on the actual strings of the set of historical transactions;
determining a first historical transaction from the first group of historical transactions;
determining a first score associated with the first historical transaction;

determining a second historical transaction from the second group of historical transactions;

determining a second score associated with the second historical transaction; and determining whether the actual string of the first historical transaction matches the string predicted based on the image.

19. The system of claim 18, wherein determining the data value for a field in the form further comprises:

upon determining that the actual string of the first historical transaction does match the string predicted based on the image, determining a first data value as the data value for the field in the form; and upon determining that the actual string of the first historical transaction does not match the string predicted based on the image, determining whether the actual string of the second historical transaction matches the string predicted based on the image.

20. The system of claim 19, wherein determining the data value for a field in the form further comprises:

upon determining that the actual string of the second historical transaction does match the string predicted based on the image, determining a second data value as the data value for the field in the form; and upon determining that the actual string of the second historical transaction does not match the string predicted based on the image, determining whether the set of digits of the first historical transaction matches the set of digits predicted based on the image.

\* \* \* \* \*